Aug. 13, 1957    H. E. ENGLESON ET AL    2,802,560
ANTI-JAM ARRANGEMENT FOR CONVEYERS
Filed April 25, 1956    2 Sheets-Sheet 1
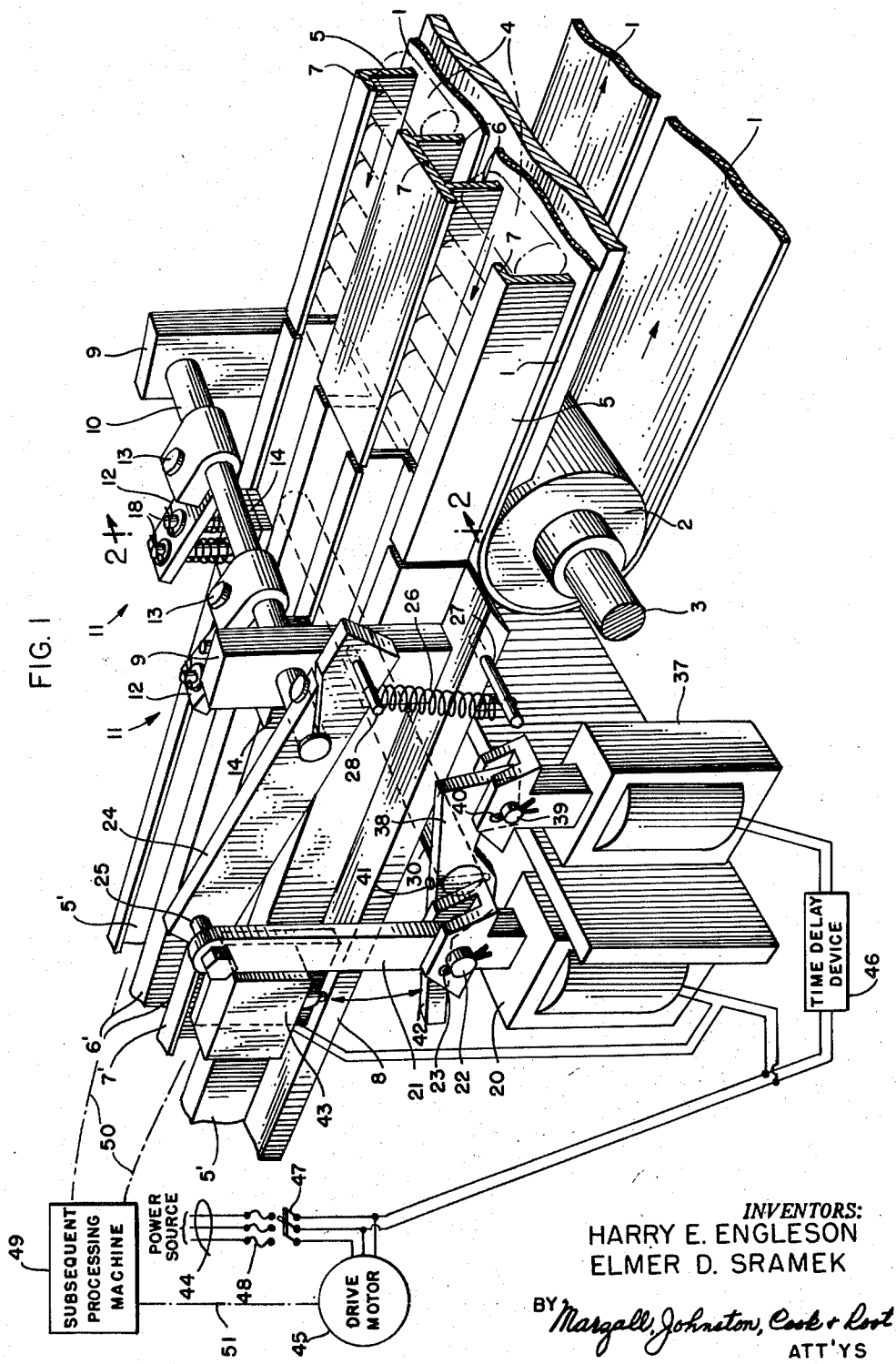
INVENTORS:
HARRY E. ENGLESON
ELMER D. SRAMEK
BY Marshall, Johnston, Cook & Root
ATT'YS

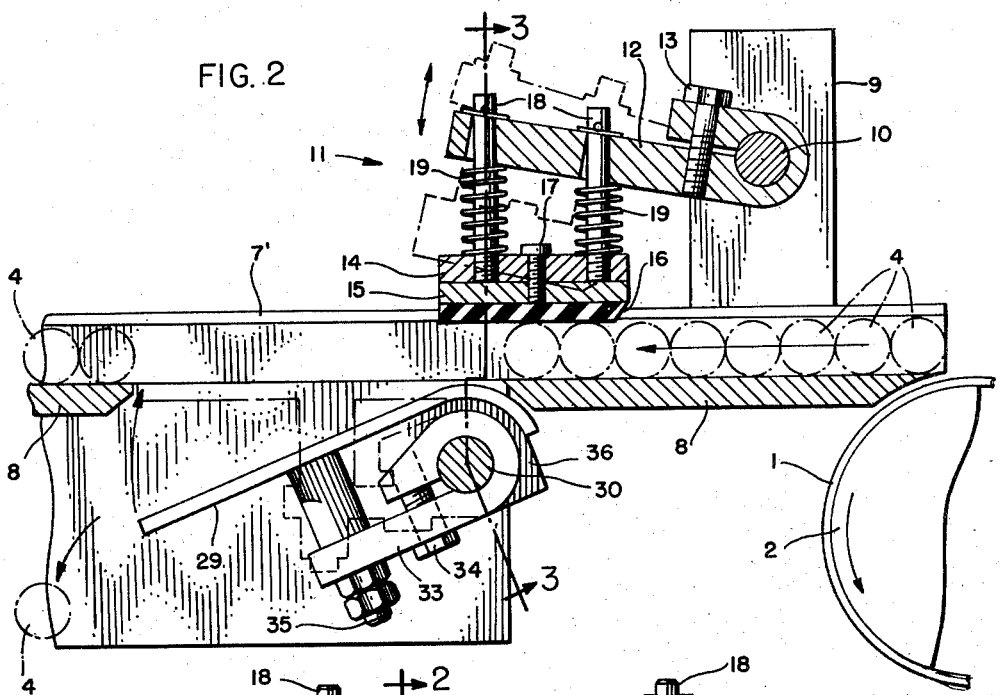
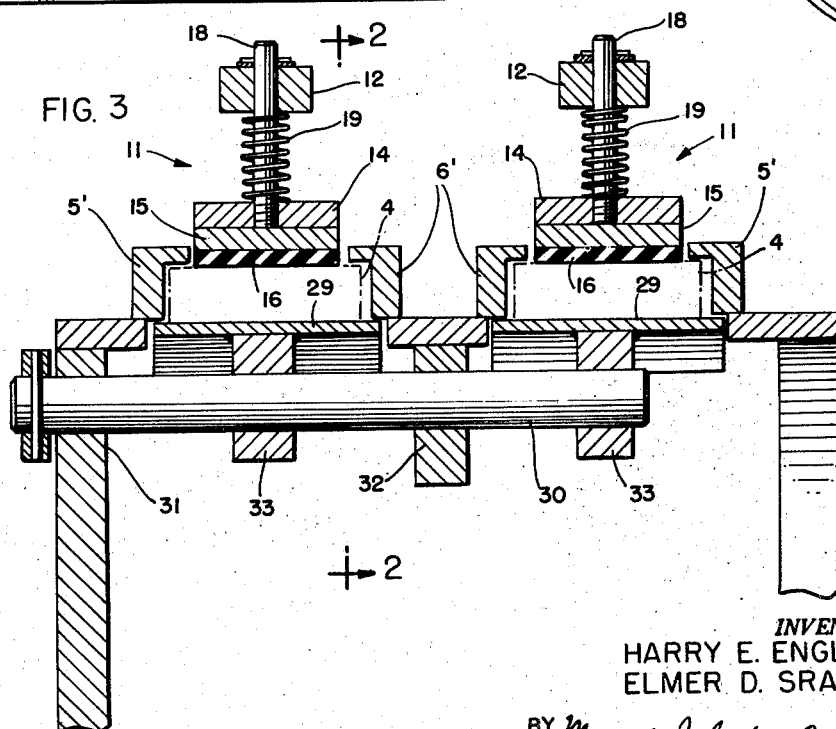

ated Aug. 13, 1957

2,802,560
ANTI-JAM ARRANGEMENT FOR CONVEYERS

Harry E. Engleson, Chicago, and Elmer D. Sramek, Cicero, Ill., assignors to F. B. Redington Co., Bellwood, Ill., a corporation of Delaware Application April 25, 1956, Serial No. 580,625

8 Claims. (Cl. 198—31)

This invention relates to conveyers for transporting articles or substances, and more particularly to such conveyers for use in connection with feed mechanism or machinery which may be subject to stoppage or interruptions in the normal operation.

In industry, conveyers are commonly used to transport articles, or the like, from one machine or processing stage to further machines or stages of processing. Ordinarily, the output from a first machine may proceed at a steady rate on the conveyer to supply the subsequent machine, but if the subsequent machine is stopped for any reason, it may be necessary to interrupt the supply of articles or substances on the conveyer.

The positions of various elements, mechanisms and machines of the present invention are described in this specification as they relate to the conveyer and to the normal movement of articles therealong. Thus, if two elements are positioned on or near the conveyer, such that the articles will normally pass the first element and thence proceed to the second element, it may be said that the second element is positioned "subsequent" to the first element. Likewise, a "subsequent machine" is a machine positioned to receive articles from the conveyer after those articles have passed a certain anti-jam apparatus of this invention.

It is an object of this invention to provide an improved conveyer arrangement for interrupting the flow of articles or substances by eliminating the articles or substances from the conveyer by a discharge device to eliminate the possibility of a jam of the articles.

A further object is to provide an improved conveyer having an outlet, or port, for discharging articles when there is likelihood of a jam at a subsequent point on the conveyer, there being a clamping device and a control arrangement for reestablishing the flow of articles along the conveyer after the possibility of a jam is alleviated.

Another object is to provide an arrangement for opening a port or trap door device to expel articles from the conveyer when a subsequent process or machine stops functioning and to further provide an arrangement for operation of a clamping device and for closure of the trap door upon resumption of subsequent process or machine, the trap door cooperating in timed relation with the clamping device to avoid the possibility of an article jamming in the port as the trap door is brought to closed position.

A preferred form of this present invention contemplates a trap door which is positioned to open a port in a conveyer for discharge of articles therefrom, a clamp device being positioned for clamping and immobilizing articles before reaching the discharge port. The trap door and the clamp device may be operated by solenoids which may be energized from the electrical circuit of a drive motor or a magnetic clutch drivingly associated with the subsequent machine which receives articles from the conveyer. Therefore, the trap door and the clamp device are operated in response to the starting and stopping of the subsequent machine. The trap door opens when the subsequent machine is stopped and the articles are expelled from the conveyer through the discharge port. When the subsequent machine is started, the clamp retains the articles for a certain period of time interval, then the trap door closes, the clamp then releasing the articles which may pass to the subsequent machine.

A more complete understanding of the present invention, its mode of operation and its advantages may be gathered from further reading of this specification, together with an inspection of the accompanying drawings in which:

Fig. 1 is a perspective view of a portion of a double conveyer employing the teachings of this invention and including a partial schematic diagram of the electrical circuit for operation of the anti-jam arrangement to interrupt the flow of articles on the conveyer;

Fig. 2 is a detail vertical section on the line 2—2 of Figs. 1 and 3; and

Fig. 3 is a detail vertical sectional view on the line 3—3 of Fig. 2.

The conveyer arrangement particularly illustrated herein is actually double in character; that is, two conveyers operate side by side to deliver articles to a processing machine. However, anti-jam mechanism, as taught by this invention, may be used in conjunction with a single conveyer, as well as the double conveyer shown. The present invention is not intended to be restricted to any particular number of conveyers positioned parallel or otherwise.

Each conveyer comprises a belt 1 which is supported at one end by a pulley 2 rotatably supported on a shaft 3, Fig. 1. Each conveyer may carry a plurality of articles 4, which are depicted as cylindrical in form and uniform in size. The articles may be rolls of candy, medicinal tablets, or the like. Rails 5 and 6 are positioned on each side of the conveyer to contain the articles in a predetermined space. The rails 6, Fig. 1, are double to form the inner sides of both of the conveyers. Each rail 6 contains a horizontally extending flange 7 extending over the articles 4 to prevent them from piling up or climbing one upon the other should the articles be blocked from moving and with the motivating force of the moving belt 1 continuing.

The moving belt 1, Fig. 1, does not extend beyond the pulley 2, but the articles 4 being transported may continue across a deadplate or stationary base part 8. The articles 4 will move across the deadplate 8 because of their own momentum and because of the continual pressure from behind by those articles resting on the belts 1. Rails 5' and 6' form a continuation of the rails 5 and 6 for containing the articles 4 in an orderly progression as they are transported across the deadplate. These rails 5' and 6' similarly have horizontally extending flanges 7'.

A pair of upstanding brackets or fixed posts 9 provide a rotatable support for a shaft 10. A clamping device 11 is provided for each of the conveyers. Each clamp member includes an arm 12 fixed to the shaft 10 by means such as a stud bolt 13 extending through a split or bifurcated part of the arm 12 to permit tightening on the shaft 10. The clamp 11 further includes a foot part 14 to which may be attached a plate 15 having thereon a pad 16 of a soft resilient material such as rubber or felt. The plate 15 may be secured to the foot part 14 by a stud bolt 17. A pair of studs 18 may be secured to the foot part 14 by means such as threads and extend through holes provided in the arms 12. A pair of compression springs 19 is associated with each clamp member 11 and is mounted around the studs 18 to resiliently secure the foot part 14 to the arm 12. The clamp member 11 being pivotal with the shaft 10, may be raised thereby to assume a position indicated by the broken lines of Fig. 2, whereupon the articles 4 are free to move along the conveyer without interference by the clamp; and, alternatively, the clamp member 11 may pivot downwardly to impinge upon the articles 4 and to hold them fast between the resilient pad 16 and the deadplate 8, as is shown in Fig. 2.

The clamp member 11 may be operated by a solenoid 20, Fig. 1, which is pivotally coupled to a link 21 by a pin 22, which pin is secured by a cotter key 23. The upper end of the link 21 is pivotally connected to an arm 24 by a pin 25. The arm 24 is mounted on and secured to the shaft 10 for operation thereof. A tension spring 26 is mounted between a pin 27 secured to a fixed part or frame of the machine and a pin 28 secured to the end of the arm 24. Thus, the spring 26 urges the right end of the arm 24 (as viewed in Fig. 1) downwardly tending to rotate the shaft 10 clockwise such that the normal positioning of the clamp members 11 will be raised free from the articles 4. When the solenoid 20 is energized, the link 21 and the left end of arm 24 will be pulled downwardly to rotate the shaft 10 counter-clockwise causing the clamp members 11 to impinge upon and clamp the articles 4.

As is shown in Fig. 2, the deadplate 8 constituting a base part of the conveyer, contains openings or discharge ports into which are fitted trap doors 29 constituting port closure devices. Each conveyer contains a port and a trap door 29, as is indicated in Fig. 3. A shaft 30 is rotatably mounted or journaled in the frame members 31 and 32 which constitute fixed parts of the machine. Associated with each trap door 29 is an arm 33 which is fixed to pivot with the shaft 30 by means of a clamped end around the shaft secured with a machine screw 34. The trap door 29 is attached to the arm 33 by a means such as a stud 35. A flange part 36 may be cast integral with the trap door 29 and may be adapted for mounting about the shaft 30. By this mounting means, the positioning of the trap door may be adjusted on the shaft 30 such that the door 29 will be substantially flush with the deadplate 8 when in a closed position.

A second solenoid 37, Fig. 1, is coupled to pivot the shaft 30 and thereby operate the trap door. A lever 38 is secured to the shaft 30 and is pivotally connected to the solenoid 37 by means of a pin 39 secured by a cotter key 40. The lever 38 may be secured to the shaft 30 by means such as a set screw 41 which may extend through the shaft and the lever 38.

In the normal operation, the solenoid 37 is energized while the solenoid 20 is de-energized. The energized solenoid 37 causes the shaft 30 to pivot and to raise the trap door and hold it flush in a closed position against the urging of gravity tending to open the door. With the solenoid 20 de-energized, the spring 26 holds the clamp members 11 in a raised position and, therefore, articles 4 being fed along the conveyer will pass freely under the clamps, across the closed trap door, and continue along the conveyer to feed a subsequent machine 49. The continuation of the conveyer to the subsequent machine 49 is shown schematically as a pair of dashed lines 50, Fig. 1.

If the subsequent machine 49 is stopped, the solenoid 37 is de-energized and gravity opens the trap doors 29, thereby permitting articles 4 along the conveyer to drop through the discharge ports. A convenient receptacle may be placed beneath the conveyer discharge ports and the trap doors to catch such articles which will be thereby expelled.

When the subsequent machine is again started, the solenoid 20 is immediately energized thereby operating the clamp members 11 and temporarily halting the articles being transported by the conveyer belts 1. The solenoid 37 is energized after a brief time delay and the trap doors are closed. Any articles 4 which have passed beneath the clamp members 11 prior to the operation thereof, will be given sufficient time to drop through the discharge ports before the trap doors 29 are operated, and thus the trap doors 29 will not close upon articles in the act of falling through the ports thereby causing a jam and blocking the conveyer. When the trap doors 29 close, an extension 42 of the lever 38, Fig. 1, moves upwardly engaging and operating an electric switch 43. Operation of the electric switch 43 de-energizes the solenoid 20 and releases the clamp members 11. Thus, the electric switch 43 is responsive to closure of the trap door and is operable to release the clamps 11 and to permit the articles 4 to resume their normal flow along the conveyer, past the clamp members 11, and over the trap door 29. The clamp members 11 operate for only the brief interval of time delay during the closure of the trap doors, and, therefore, the articles 4 moving toward the clamp from the right, Figs. 1 and 2, will not have sufficient time to pile up and jam unduly.

The electrical energy for operating the solenoids 20 and 37 is preferably obtained from the same power source 44 supplying the drive motor 45 coupled to the subsequent machine 49 by drive means shown schematically by the dashed line 51. If a coupling device such as a magnetic clutch is used at 51 to drive the subsequent machine from a continuously powered motor, the solenoids may be electrically coupled to the control circuit of such coupling device. Thus, the solenoids are connected to operate only when the subsequent machine 49 is started and is in operation. The circuit for supplying electrical energy for the solenoid 37 includes a time delay device 46 which may be a clock mechanism or any other conventional arrangement for delaying the operation of electrical apparatus. The drive motor 45 is shown schematically to be a three-phase motor which may have a motor control and overload switch shown schematically as a three-blade switch 47 and a set of fuses 48.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for interrupting a flow of articles along a conveyer to a subsequent machine and for reestablishing the flow therealong, said apparatus comprising a clamping device operatively associated with the conveyer, a discharge port positioned in the conveyer subsequent to the clamping device, a port closure device positioned to move into the port and to present a flush surface in the conveyer for permitting the articles to pass over the port and continue along the conveyer, means operatively associated with the port closure device for holding the port closure device in a closed position, means operatively associated with the clamping device for causing the clamping device to impinge upon articles in the conveyer, and control means associated with both of the aforementioned means, said control means being sensitive to the operation of the subsequent machine whereby the discharge port is opened to expel articles from the conveyer when the subsequent machine stops and whereby the articles are held by the the clamping device to permit closure of the port when the subsequent machine starts.

2. Apparatus for interrupting a flow of articles along a conveyer to a subsequent machine and for reestablishing the flow therealong, said apparatus comprising a clamping device operatively associated with the conveyer, a deadplate having a discharge port positioned in the conveyer subsequent to the clamping device, a port closure device positioned to move into the discharge port and provide a surface flush across the port for permitting the articles to pass to the subsequent machine, means coupled to the clamping device for causing the device to impinge upon the articles in the conveyer, means coupled to the port closure device for moving the device and closing the discharge port, both of the aforesaid means being electrically associated with a drive means of the subsequent machine whereby starting of the subsequent machine causes operation of the clamping device and the port closure device, and a time delay means electrically associated with the means for moving the port closure device for providing a time interval between operation of the clamping device and the closing of the discharge port.

3. Apparatus for interrupting a flow of articles along a conveyer to a subsequent machine and for reestablishing the flow therealong, said apparatus comprising a clamping device operatively associated with the conveyer, a deadplate forming a stationary base part of the conveyer, said deadplate having a discharge port positioned subsequently to the clamping device, a trap door mounted to move into and close the discharge port, a first solenoid operatively coupled to the clamping device, a second solenoid operatively coupled to the trap door, both of said solenoids being sensitive to the operation and to the non-operation of the subsequent machine, said first solenoid being operable to cause the clamping device to impinge upon the articles in the conveyer when the subsequent machine is started, and a time delay device operatively associated with the second solenoid for providing a time interval after the start of the subsequent machine and after the operation of the clamping device before permitting operation of the second solenoid and the closure of the trap door.

4. Apparatus for interrupting a flow of articles along a conveyor to a subsequent machine and for reestablishing the flow therealong, said apparatus comprising a deadplate forming a stationary base part of the conveyer, a clamping device positioned to move into close spaced relation with the deadplate for impinging upon the articles in the conveyer, said deadplate having a discharge port positioned subsequent to the clamping device, a trap door positioned to move into and close the discharge port, a first solenoid operatively coupled to the clamping device, a second solenoid operatively coupled to the trap door, both of said solenoids being sensitive to the operation and to the non-operation of the subsequent machine, said first solenoid being operable to move the clamping device and impinge upon the articles immediately when the subsequent machine is started, a time delay device electrically associated with the second solenoid, said time delay device being operable to provide a time interval after operation of the clamping device and before closure of the trap door, and an electric switch electrically associated with the first solenoid, said electric switch being responsive to the closure of the trap door and being operable to de-energize the first solenoid and thereby release the clamping means when the trap door is closed.

5. Apparatus for interrupting and for reestablishing a flow of articles along a conveyer to a subsequent machine which operates in response to an electrical control circuit, said apparatus comprising a deadplate forming a stationary base part of the conveyer, a clamping device positioned to move into close spaced relation with the deadplate for clamping and holding articles in the conveyer, said deadplate having a discharge port positioned subsequent to the clamping device, a trap door hingedly mounted and positioned to move into and close the discharge port, a first solenoid operatively coupled to the clamping device, a second solenoid operatively coupled to the trap door, said first solenoid being electrically coupled directly to the control circuit of the subsequent machine, a time delay device electrically coupled between the second solenoid and the control circuit of the subsequent machine, and an electric switch electrically coupled to the first solenoid, said electric switch being responsive to closure of the trap door, said first solenoid being operable to move the clamping device and clamp the articles in the conveyer immediately when the subsequent machine starts and being further operable to release the clamping device when the trap door closes, said second solenoid being operable to close the trap door after a time delay interval when the subsequent machine starts, and being further operable to retain the trap door closed during the operation of the subsequent machine and to release the trap door when the subsequent machine stops.

6. Apparatus for interrupting and for reestablishing a flow of articles along a conveyer to a subsequent processing machine, said apparatus comprising a deadplate forming a stationary base part of the conveyer, a clamping device pivotally mounted over the deadplate and movable to clamp articles against the deadplate, said deadplate having an opening for expelling articles from the conveyer therethrough, a trap door device pivotally mounted below the deadplate and movable to close the opening in the deadplate, means associated with the clamping device for clamping the articles during a time interval immediately following a starting of the subsequent machine, and means associated with the trap door for closing the trap door into the opening after the time interval following the starting of the subsequent machine and for retaining the trap door closed as long as the subsequent machine continues to operate, said clamping device including shaft coupled to be rotated by the first mentioned means, an arm secured to the shaft, a foot part having a pad of resilient material secured thereto, and a resilient attaching means for resiliently attaching the foot part to the arm whereby rotation of the shaft and the arm secured thereto moves the foot part into close spaced relation with the deadplate and causes the foot part to resiliently impinge upon and to hold the articles clamped between the deadplate and the foot part.

7. Apparatus for interrupting and for reestablishing a flow of articles along a conveyer to a subsequent machine which operates in response to an electrical control circuit, said apparatus comprising a deadplate forming a stationary base part of the conveyer, a clamping device positioned to move into close spaced relation with the deadplate for clamping and holding articles in the conveyer, the deadplate having a discharge port positioned subsequent to the clamping device, a shaft extending horizontally below the deadplate, a trap door secured to the shaft and movable to close the discharge port as the shaft is rotated, a lever arm secured to the shaft, a first solenoid operatively coupled to the clamping device, a second solenoid pivotally connected to the lever, said first solenoid being electrically coupled directly to the control circuit of the subsequent machine, a time delay device electrically coupled between the second solenoid and the control circuit of the subsequent machine, an electrical switch electrically coupled to the first solenoid, said lever having a part extending into spaced relation with the electric switch, said first solenoid being operable to move he clamping device and clamp the articles in the conveyer immediately when the subsequent machine starts, said second solenoid being operable to close the trap door and to move the lever extension into engagement with the electric switch after a time delay interval when the subsequent machine starts, said electric switch being operable to de-energize the first solenoid and to release the clamping device when the trap door closes and the lever extension engages the switch.

8. Apparatus for interrupting and for reestablishing a flow of articles along a conveyer to a subsequent machine which operates in response to an electrical control circuit, said apparatus comprising a deadplate forming a stationary base part of the conveyer, a clamping device positioned to move into spaced relation with the deadplate for clamping and holding articles in the conveyer, said clamping device being secured to a first shaft, a first lever secured to the first shaft for rotation of the shaft and operation of the clamping device, a spring coupled to the first lever for urging the clamping device into a raised position, a first solenoid coupled to the first lever for moving the clamping device downwardly against the urging of the spring and for thereby impinging upon the articles in the conveyer, said deadplate having a discharge port positioned subsequent to the clamping device, a second shaft positioned below the deadplate, a trap door secured to the second shaft and movable thereon into a position for closing the discharge port, a second lever secured to the second shaft, a second solenoid pivotally connected to the second lever and operable to close the trap door against the urging of gravity, said second lever having an extension thereon, the first solenoid being electrically coupled directly to the control circuit for the subsequent machine, a time delay device electrically coupled between the second solenoid and the control circuit of the subsequent machine, said first solenoid being energized immediately when the subsequent machine starts whereby the clamping device impinges upon and holds the articles in the conveyer, said second solenoid being energized after a time delay when the subsequent machine starts whereupon the trap door is closed, and an electric switch positioned to be operated by the second lever as the trap door is closed, said electric switch being electrically coupled to de-energize the first solenoid when the trap door is closed.

References Cited in the file of this patent
UNITED STATES PATENTS 2,037,931    Schmidt _____ Apr. 21, 1936